United States Patent [19]

Lederman et al.

[11] Patent Number: 4,787,490

[45] Date of Patent: Nov. 29, 1988

[54] METAL AND PLASTIC COMBINATION ROLLER CLUTCH CAGE

[75] Inventors: Frederick E. Lederman, Sandusky; Albert D. Johnston, Huron, both of Ohio

[73] Assignee: General Motors Corporation, Detroit, Mich.

[21] Appl. No.: 61,488

[22] Filed: Jun. 15, 1987

[51] Int. Cl.[4] ............... F16D 41/06; F16D 15/00
[52] U.S. Cl. .................... 192/45; 192/41 R
[58] Field of Search ........... 192/41 R, 41 A, 45; 384/576, 578

[56] References Cited

U.S. PATENT DOCUMENTS

| | | |
|---|---|---|
| 2,969,267 | 1/1961 | Gothberg . |
| 3,500,977 | 3/1970 | Gehrke .................. 192/45 |
| 4,054,340 | 10/1977 | Broshkevitch et al. ........ 384/576 |
| 4,088,211 | 5/1978 | Doller et al. .................. 192/45 |
| 4,185,724 | 1/1980 | Kitchin ........................ 192/45 |
| 4,187,937 | 2/1980 | Kitchin ........................ 192/45 |
| 4,566,567 | 1/1986 | Miyatake .................... 192/45 |
| 4,679,676 | 7/1987 | King et al. ................... 192/45 |
| 4,712,661 | 12/1987 | Lederman et al. ............ 192/45 |

Primary Examiner—Rodney H. Bonck
Attorney, Agent, or Firm—Patrick M. Griffin

[57] ABSTRACT

A roller clutch cage combines the advantages of easily molded plastic cross bars with the strength of steel side rails, but is assembled without the need for any rivets or the deformation of any metal part. Cooperating flexible arms and fulcrum surfaces molded to each end of each plastic cross bar tightly grip the side rails, providing a very rigid structure.

3 Claims, 1 Drawing Sheet

U.S. Patent   Nov. 29, 1988   4,787,490

METAL AND PLASTIC COMBINATION ROLLER CLUTCH CAGE

This invention relates to overrunning clutches in general, and specifically to a roller clutch cage combining metal side rails and plastic cross bars that fit together so as to give a rigid structure without the use of rivets or separate fasteners.

BACKGROUND OF THE INVENTION

Overrunning clutches are commonly used to allow one way relative rotation between a pair of coaxial races. The mechanism that provides such selective rotation is the alternate engagement and disengagement of a plurality of spring energized metal wedging elements, typically rollers, between annularly spaced inner surfaces of the clutch A roller clutch will generally have some type of cage that provides a basic structure framework to return the rollers and their energizing springs. A typical cage structure includes a pair of axially spaced side rails and a plurality of circumferentially spaced cross bars that join the two side rails together, thereby providing a plurality of roller retention pockets. Such a cage may be molded integrally of plastic in one piece, which is economical, and which allows complex shapes to be easily formed. However, in an environment such as the automatic transmission of a motor vehicle, the rollers are subjected to high speeds and heavy skewing forces that can push the roller ends very strongly into the cage side rails. Consequently, at least the side rails must be made of metal, generally stamped steel, in order to withstand the skewing forces.

Unlike integrally molded one piece cages, steel side rails must be separately structurally joined to the cross bars. The most common approach is to simply rivet the cross bars to the side rails. The strength of a rivet joint between cross bar and side rail is inevitably limited to the size of the rivet head, which may, in some cases, necessitate the use of many rivets, increasing the cost of manufacture. Another approach is to provide interfitting tabs and slots on the ends of the cross bars and the side rails, and to then locally deform or bend the tab or slot, or both, to provide a joint. In some cages, the cross bars are integrally stamped with one of the side rails, which makes for a complex and expensive shape. And any manufacturing operation involving metal deformation is difficult and expensive to carry out repetitively and accurately. This is especially true if the tab is an integral part of the side rail, because it is difficult to heat treat the main part of the side rail while leaving the deformable tab soft. Yet another approach is the use of resilient metal clips that are pressed over the cross bars and side rails to retain them together, but this involves separate pieces, which is generally more costly. It would be desirable, if possible, to combine the molding ease of plastic with the strength of steel in a cage structure having a simply shaped side rail, but which could be assembled without a metal deformation step.

SUMMARY OF THE INVENTION

The invention provides a roller clutch cage the basic components of which are plastic cross bars and metal side rails, and which can be assembled without rivets or the deformation of any metal, while still providing a very rigid and strong unitary structure. The side rails are stamped from flat steel stock in an annular, essentially flat shape, with a uniform thickness. In the embodiment disclosed, the side rails are sized so as to fit closely within the annular space between the races, but each has a plurality of reduced width sections formed by radially aligned pairs of notches cut into the outer and inner edges thereof. The plastic cross bars have a design that may be simply molded, and have a novel structure at each end thereof that interconnects the side rails to maintain them rigidly axially spaced, thereby providing a plurality of retention pockets for the rollers.

Each end of each cross bar is molded with a central body portion from which extends a pair of radially aligned and flexible cantilevered arms. The end of each arm includes an axially inwardly facing gripping surface coplanar with the gripping surface of the opposed arm. In the unflexed state, the arms are spaced apart by approximately the width of the reduced width sections of the side rails, and are sized so as to fit within the pairs of side rail notches. A support column also extends axially from each cross bar body portion, between the arms, and terminates in a slightly rounded fulcrum surface. The fulcrum surface faces axially outwardly, is radially aligned with the gripping surfaces of the arms, and is axially spaced therefrom by slightly less than the thickness of the side rails. In addition, in the embodiment disclosed, the arms are molded with a pair of stop members extending circumferentially to either side thereof, which have axially outwardly facing and coplanar stop surfaces that are axially spaced from the gripping surfaces by approximately the thickness of the side rails.

The cage may be assembled by aligning each pair of arms with a pair of side rail notches and then flexing the arms apart and moving them over the reduced width portions of the side rails. The side rails are thereby held between the gripping surfaces and the intermediate fulcrum surfaces. However, no separate rivets or any metal deformation is needed. Specifically, the gripping surfaces create an axially inward force on the outside of the side rails and the intermediate fulcrum surfaces act in opposition, creating an axially outward force on the inside of the side rails. Given the differential between the side rail thickness and the axial spacing of the gripping and fulcrum surfaces, the side rails will be very tightly held. The strength of the holding force may be easily increased by increasing the differential. Furthermore, given the fact that the fulcrum surface is radially aligned with the gripping surfaces of the arms, the moment arm through which the holding forces can act to deform the side rails is minimized, limited to the width of the side rails or less.

In addition, fitting the flexible arms into the side rail notches circumferentially locates the cross bars to provide roller retention pockets in cooperation with the side rails, and allows the entire width of the side rails to be presented to the ends of the rollers. In the particular embodiment disclosed, additionally rigidity is provided by the stop surfaces, which rest closely against the inside of the side rails, acting to further resist any forces that would tend to twist the side rails out of the grip of the cross bars.

It is, therefore, a general object of the invention to provide a roller clutch cage that combines molded plastic cross bars and stamped annular metal side rails in a rigid, strong structure, without rivets or metal deformation of any kind.

It is another object of the invention to provide such a cage by holding the side rails tightly between pairs of flexible arms and cooperating intermediate support columns molded integrally with the plastic cross bars, thereby providing high rigidity while minimizing the moment arm through which the holding forces of the arms and support columns can act to deform the side rails.

It is yet another object of the invention to provide the side rails with reduced width sections defined by radially aligned pairs of notches in the side rails into which the arms fit, thereby circumferentially locating the cross bars relative to the side rails and creating roller retention pockets with a maximum area of the side rails presented to the ends of the rollers.

It is still another object of the invention to provide the arms with stop surfaces that rest closely against the inside of the side rails to further rigidify the cage.

DESCRIPTION OF THE PREFERRED EMBODIMENT

These and other objects and features of the inventions will appear from the following written description, and from the drawings, in which.

Figure 4:
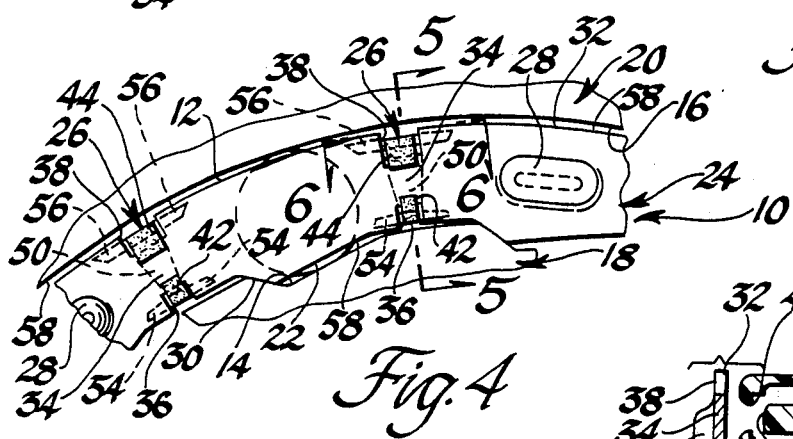
Figure 5:
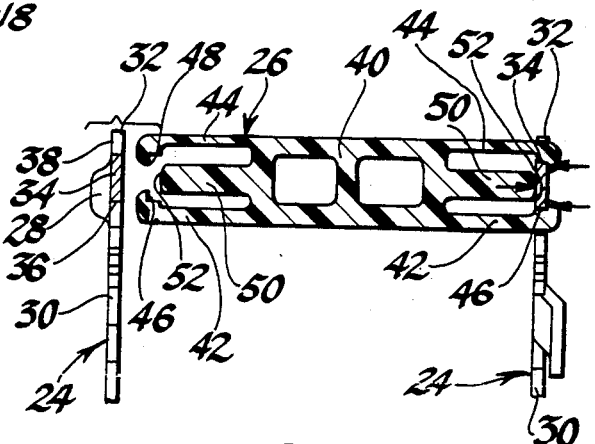
Figure 6:
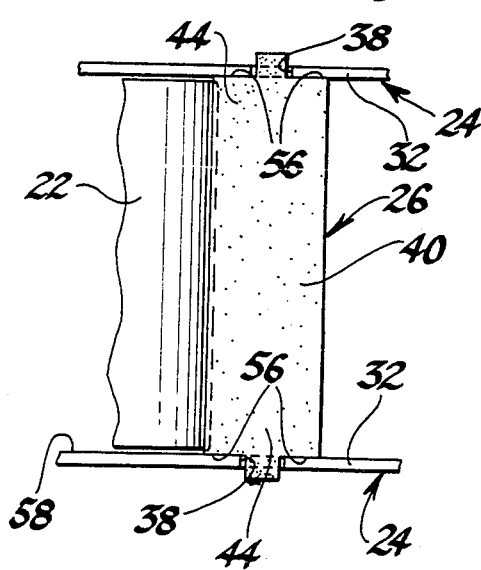

FIG. 4 a side view of a portion of the assembled cage after installation between the races, and showing the location of one roller;

FIG. 5 is a sectional view of the cage before installation, taken along the line 5—5 of FIG. 4, and showing one side rail assembled, and one not;

FIG. 6 is a view looking along the line 6—6 of FIG. 4.

Referring first to FIG. 4, a preferred embodiment of the roller clutch cage of the invention, designated generally at 10, is shown installed in the annular space 12 defined between the inner and outer surfaces 14 and 16 of coaxial inner and outer clutch races 18 and 20, respectively. Typically, one race surface, here the outer surface 16, is cylindrical, while the inner race surface 14 has a general saw tooth shape, which provides camming ramps. In the particular environment disclosed, races 18 and 20 are maintained coaxial by separate bearings, not shown, so cage 10 need not be what is commonly referred to as a concentricity control cage. That is, cage 10 need not itself have journal blocks or other structure sized so as to ride closely between the surfaces 14 and 16 and maintain the races 18 and 20 coaxial, although it could, if desired However, cage 10 must provide the basic structural framework that retains a plurality of wedging elements within the annular space 12. Here, the wedging elements are cylindrical rollers, one of which is shown at 22 In the particular environment involved, which is a vehicle automatic transmission, the rollers 22 are subject to high speeds and loads which tend to spin and skew the rollers 22 and which would force them axially out of the annular space 12, in the absence of some confining means. Consequently, the cage 10 must be strong and rigid The basic components of cage 10 are a pair of annular side rails, designated generally at 24, and twelve plastic cross bars designated generally at 26, which hold the side rails 24 together in rigid, axially spaced relation. The details of these basic components and their structural cooperation will be described next.

Figure 1:
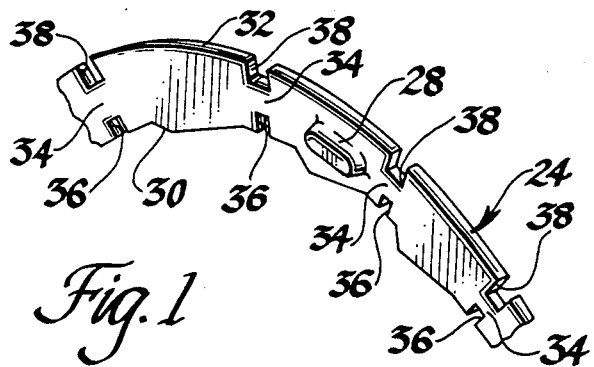
FIG. 1 is a perspective view of a portion of one side rail prior to assembling the cage.

Referring next to FIG. 1, side rails 24 are each stamped from flat steel stock in a basically annular shape, and are essentially flat, except for details such as localized side bulges 28, which serve a purpose described below. Side rails 24 are also substantially identical, with a uniform thickness. One side rail may include tabs or other structure unique to it which act as stops and which allow the cage 10 to be installed by axially inserting it into the annular space 12, details which do not concern the invention. In the embodiment disclosed, the side rails 24 are sized so as to fit closely within the annular space 12, meaning that their general width as measured between their inner and outer edges 30 and 32 is just slightly less than the width of the annular space 12. As is conventional, one edge, here the inner edge 30, has a general saw tooth shape so as to non-rotatably interfit with the inner clutch race surface 14. Each side rail 24 also has a plurality of twelve reduced width sections 34 formed by radially aligned pairs of notches 36 and 38 cut into the inner and outer edges 30 and 32 respectively. Notch 38 is somewhat wider than notch 30. Given the shape described, the side rails 24 may be stamped very simply, and heat treated as a whole, since no part thereof has to be later deformed in order to assemble the cage 10, as will appear below.

Figure 3:
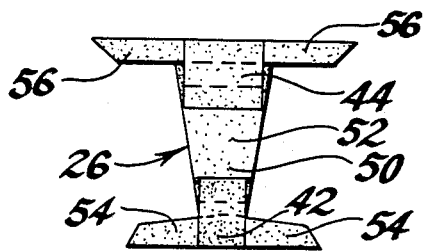
FIG. 3 is an end view of one cross bar prior to assembling the cage.
Figure 2:
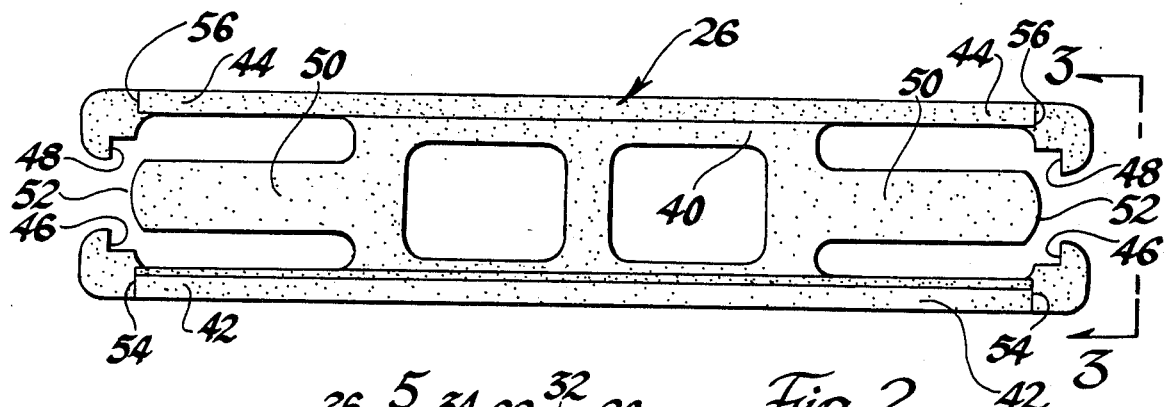
FIG. 2 is a side view of one cross bar prior to assembling the cage.

Referring next to FIGS. 2 and 3, each cross bar 26 is injection molded of a suitable plastic, such as fiber filled nylon, which allows it to be made very economically and with a relatively complex shape. Each cross bar 26 is molded with a central body portion 40, which is hollowed out for purposes of lightness and molding shrinkage control. Each end of each cross bar 26 is molded with a pair of radially aligned, flexible cantilevered arms 42 and 44 that extend parallel to one another from body portion 40. While they are identical in length, the outer arm 44 is slightly wider than the inner arm 42, and each arm 42 and 44 is slightly narrower that a corresponding side rail notch 36 and 38, so as to fit therewithin easily, for a purpose described below. The end of each arm 42 and 44 is molded with a flat, axially inwardly facing gripping surface 46 and 48 respectively. In the unflexed state shown in FIGS. 2 and 3, the arms 42 and 44 are radially spaced apart by approximately the width of the side rail reduced width portions 34, and the gripping surfaces 46 and 48 are coplanar, extending radially toward one another sufficiently to overlap the reduced width portions 34. Each end of each cross bar 26 is also molded with a support column 50 that extends axially from body portion 40, parallel to and between the arms 42 and 44. Each support column 50 terminates in a slightly rounded, axially outwardly facing fulcrum surface 52. Since each support column 50 is located between a pair of arms 42 and 44, each fulcrum surface 52 is generally radially aligned with the gripping surfaces 46 and 48, as best seen in FIG. 3. In addition, in the embodiment disclosed, each arm 42 and 44 is molded with a pair of wing like members extending circumferentially in either direction therefrom, which define axially outwardly facing, coplanar stop surfaces 54 and 56 respectively. Stop surfaces 54 and 56 are axially spaced from the plane of the gripping surfaces 46 and 48 by approximately the thickness of the side rails 24, while each fulcrum surface 52 is axially spaced from the plane of the gripping surfaces 46 and 48 same plane by slightly less than the thickness of the side rails 24, for a reason described below. As may be best seen in FIG. 2, each cross bar 26 is configured so that it may be molded by a single pair of mold halves that part along a straight line axis, since there are no undercut surfaces. This is one of the great engineering and cost benefits of molded plastic.

Referring next to FIGS. 5 and 6, cage 10 is assembled by aligning each pair of arms 42 and 44 of each cross bar 26 with a pair of respective side rail notches 36 and 38, then flexing the arms 42 and 44 apart and pushing the side rails 24 inboard under some force until they hit and slightly compress the fulcrum surfaces 52. This may be done with a suitable fixture, or an automatically acting assembly apparatus, and may be done for each side rail 24 separately, or for both at once. Then, the arms 42 and 44 are released, flexing back without binding into the respective notch pairs 36 and 38, given their relative sizing described above. This flexing and releasing step does not permanently deform or change the shape of any component, as does a riveting or metal bending operation. After assembly, the side rails 24 and the twelve cross bars 26 are circumferentially located relative to one another by virtue of the arms 42 and 44 being interfitted with the notches 36 and 38. The twelve cross bars 26 and the side rails 24 thereby provide twelve same size roller retention pockets 58, as best seen in FIG. 6. Retention pockets 58, as is conventional, would each contain a roller 22 and associated energizing spring, not illustrated. The cage 10, with rollers 24, can then be installed as a unit in the annular space 12. After installation of the cage 10, the roller pockets 58 are well armored against the ends of the rapidly spinning and skewing rollers 22. Furthermore, the exposed ends of arms 42 and 44 would be protected by the side bulges 28, which are conventionally used to protect rivet heads.

Referring next to FIGS. 3, 5 and 6, the strength and rigidity of cage 10 results from structural cooperation between the arm pairs 42 and 44 and the associated support columns 50. The gripping surfaces 46 and 48 overlap the reduced width portions 34, and create an axially inward force on the outside of the side rails 24, forces represented by the arrows in FIG. 5. The intermediate fulcrum surfaces 52, on the other hand, create an axially outward force on the inside of the side rails 24. The side rails 24 are strongly gripped by the cross bars 26 and retained in parallel, rigidly axially spaced relation with a continual tension being maintained. The tightness with which the side rails 24 are held is proportional to how much greater the thickness of the side rails 24 is than the axial spacing of the fulcrum surfaces 52 from the gripping surfaces 46 and 48. The holding force may be made quite great by increasing that differential, as great or greater than with a conventional headed over rivet or bent metal tab. However, the structural integrity of the side rails 24 is not threatened. This is because the moment arm through which the arm pairs 42, 44 and the intermediate support columns 50 can act to deform the side rails 24 is minimized. That moment arm is graphically represented by the perpendicular distance between the arrows in Figure 5. The moment arm is limited at least to the width of the side rails 24, and even less in the embodiment disclosed, because of the reduced width portions 34. Furthermore, the side rails 24, given their simple shape, may be easily made thick enough, or hardened to be stiff enough, to resist very high holding forces. In the embodiment disclosed, even more rigidity for cage 10 is provided by the stop surfaces 54 and 56, which rest closely against the inside of the side rails 24. Should the end of a roller 22 be forced into the inside of a side rail 24, the consequent force that would otherwise tend to twist the side rail 24 out of the grip of the cross bars 26 would be additionally resisted by the stop surfaces 54 and 56, which otherwise put no significant force of the side rails 24.

Variations of the preferred embodiment disclosed could be made. Side rails 24 of an even simpler shape could be used, with unnotched inner and outer edges. In that case, the arms 42 and 44 would just be fitted directly over the inner and outer edges of the side rails 24. However, fitting the arms 42 and 44 into the notches 36 and 38 provides the dual benefits of rigorously aligning and circumferentially locating the side rails 24 relative to the cross bars 26, and also allows the roller pockets 58 to be armored by the entire width of the side rails 24. Without the notches, that part of the side rails 24 that forms the roller pockets 58 would necessarily be narrower. The stop surfaces 54 and 56 could be eliminated, but they are easily molded and do cooperate with the side rails 24 to provide extra rigidity, without creating any deforming forces on the side rails 24. It would be possible to provide the ends of the arms 42 and 44 with a more rounded lead, so that they could automatically flex apart and snap fit over the side rail reduced width portions 34 when the side rails 24 were pushed axially inwardly, thereby simplifying the assembly process. Therefore, it will be understood that the invention is not intended to be limited to just the embodiment disclosed.

The embodiments of the invention in which an exclusive property or privilege is claimed are defined as follows:

1. An overrunning clutch cage of the type that retains a plurality of wedging elements in an annular space defined between a pair of coaxial races, comprising,
    a pair of generally annular and substantially flat metal side rails having a predetermined width as measured between inner and outer edges thereof and a substantially uniform thickness, and,
    a plurality of axially extending, circumferentially spaced plastic cross bars interconnecting said side rails with each end of each of said cross bars including,
    a pair of radially aligned and flexible cantilevered arms that are, in an unflexed state, spaced apart by substantially the width of said side rails, said arms each further including an axially inwardly facing gripping surface, and,
    a support column terminating in an axially outwardly facing fulcrum surface located intermediate to and substantially radially aligned with said arm gripping surfaces and axially spaced from said gripping surfaces by slightly less than the thickness of said side rails,
    whereby said arms may be flexed apart and moved over the inner and outer edges of said annular side rails, thereby tightly holding said side rails with an axially inward force of said gripping surfaces and an axially outward force of said intermediate fulcrum surface, thereby providing rigidity to said cage while limiting the moment arm of said forces on said side rails to the width of said side rails.

2. An overrunning clutch cage of the type that retains a plurality of wedging elements in an annular space defined between a pair of coaxial races, comprising,
    a pair of generally annular metal side rails having a substantially uniform thickness and having a width measured between inner and outer edges thereof sufficient to fit closely within said annular space, said side rails each having a plurality of circumferentially spaced reduced width portions defined by pairs of radially aligned notches formed in the inner and outer edges thereof, a plurality of axially extending, circumferentially spaced plastic cross bars interconnecting said side rails, with each end of each of said cross bars including, a pair of radially aligned and flexible cantilevered arms that are, in an unflexed state, spaced apart by substantially the width of said reduced width portions and sized so as to fit within said pairs of notches, said arms each further including an axially inwardly facing gripping surface, and, a support column terminating in an axially outwardly facing fulcrum surface located intermediate to and substantially radially aligned with said arm gripping surfaces and axially spaced from said gripping surfaces by slightly less than the thickness of said side rails, whereby said arms may be aligned with said notches and flexed apart and moved over the reduced width portions of said annular side rails, thereby circumferentially locating said side rails relative to said cross bars so as to cooperatively form wedging element retention pockets with the full width of said side rails presented to said wedging elements, said cross bars also tightly holding said side rails with an axially inward force of said griping surfaces and an axially outward force of said intermediate fulcrum surface surfaces, thereby providing rigidity to said cage while limiting the moment arm of said forces on said side rails to less than the full width of said side rails.

3. An overrunning clutch cage of the type that retains a plurality of wedging elements in an annular space defined between a pair of coaxial races, comprising, a pair of generally annular and substantially flat metal side rails having a predetermined width as measured between inner and outer edges thereof and a substantially uniform thickness, and, a plurality of axially extending, circumferentially spaced plastic cross bars interconnecting said side rails, with each end of each of said cross bars including, a pair of radially aligned and flexible cantilevered arms that are, in an unflexed state, spaced apart by substantially the width of said side rails, said arms each further including an axially inwardly facing gripping surface, said arms each also having circumferentially extending stop members with axially outwardly facing stop surfaces axially spaced from said jaw gripping surfaces by substantially the thickness of said side rails, and, a support column terminating in an axially outwardly facing fulcrum surface located intermediate to and substantially radially aligned with said arm gripping surfaces and axially spaced from said gripping surfaces by slightly less than the thickness of said side rails, whereby said arms may be flexed apart and over the inner and outer edges of said annular side rails, thereby tightly holding said side rails with an axially inward force of said gripping surfaces and an axially outward force of said intermediate fulcrum surface, while said stop surfaces rest closely against said side rails, thereby providing extra rigidity to said cage, with the moment arm of said forces on said side rails being limited to the width of said side rails.

* * * * *